Patented Nov. 1, 1932

1,886,017

UNITED STATES PATENT OFFICE

ERNST HONOLD, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

1-HYDROXY-4-HALOGEN-ANTHRAQUINONE-2-SULFONIC-ACID AND PROCESS OF MAKING SAME

No Drawing. Application filed July 30, 1930, Serial No. 471,896, and in Germany August 28, 1929.

My present invention relates to 1-hydroxy-4-halogen-anthraquinone-2-sulfonic acids and to a process of making same.

The process in accordance with this invention is by diazotizing a 1-amino-4-halogen-anthraquinone-2-sulfonic acid of the formula:

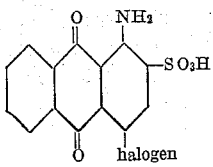

and acting on the diazo-compound thus formed with copper or a copper compound.

Advantageously such an amount of the copper compound is used that the reaction product precipitates in the form of its difficultly soluble copper salt. By dissolving this salt in an acid 1-hydroxy-4-halogen-anthraquinone-2-sulfonic acid is obtained in a particularly pure state.

It is a surprising fact that by the present process the diazo-group is easily replaced by the hydroxy-group, since the diazo-compounds of 1-amino-4-halogen-anthraquinone-2-sulfonic acids exhibit in acid solution a remarkable stability even at higher temperatures.

The 1-hydroxy-4-halogen-anthraquinone-2-sulfonic acids thus produced correspond to the formula:

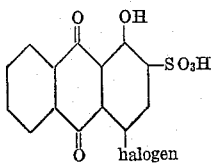

They are valuable intermediates for the production of dyestuffs especially acid wool dyestuffs.

In order to further illustrate my invention the following examples are given, the parts being by weight and all temperatures in centigrade degrees. But I wish it to be understood that I am not limited to the particular conditions nor specific products mentioned therein.

Example 1

50 parts of the sodium salt of 1-amino-4-bromo-anthraquinone-2-sulfonic acid are diazotized in an aqueous solution as usual and the diazo-compound is isolated. An aqueous paste containing 20–30% of this diazo-compound is slowly introduced while stirring into a solution warmed to 0–100° and consisting of 40 parts of copper sulfate and 600 parts of water. When the evolution of nitrogen has ceased, the copper salt precipitated in the form of brown crystals is filtered off and washed. This copper compound is treated with hot water and dilute hydrochloric acid. The solution thus obtained is mixed with common salt. Thereby the sodium salt of 1-hydroxy-4-bromo-anthraquinone-2-sulfonic acid of the formula

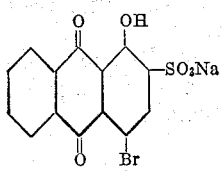

is obtained in a pure form and in a nearly theoretical yield. It represents a yellow powder soluble in concentrated sulfuric acid with an orange-red tint, in water with a yellow tint which turns to dark red on the addition of alkali.

Example 2

Into a suspension of 5 parts of copper powder in 800 parts of water which is warmed to 90–100°, there are slowly introduced while stirring 50 parts of a 50% paste of 1-diazo-4-bromo-anthraquinone-2-sulfonic acid. When the violent evolution of nitrogen has ceased, the formed 1-hydroxy-4-bromo-anthraquinone-2-sulfonic acid is isolated as sodium salt by the addition of common salt to the filtered solution. The product is identical to that of Example 1.

The reaction occurs likewise in the presence of free acid.

Example 3

35 parts of the sodium salt of 1-amino-4-chloro-anthraquinone-2-sulfonic acid are converted into the difficultly soluble diazo-compound by diazotizing in an aqueous solution. The diazo-compound is treated with a hot solution of 25 parts of copper sulfate as described in Example 1. Thereby the crystallized copper salt of 1-hydroxy-4-chloro-anthraquinone-2-sulfonic acid is obtained. This compound is converted into the free acid of the formula:

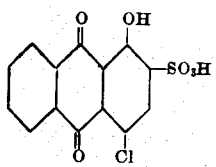

by treating it with dilute acid. By the addition of common salt its yellow sodium salt is isolated which dissolves in concentrated sulfuric acid with an orange, in water with a light yellow, in alkalies with a blood-red tint.

I claim:

1. Process which comprises diazotizing a 1-amino-4-halogen-anthraquinone-2-sulfonic acid of the formula:

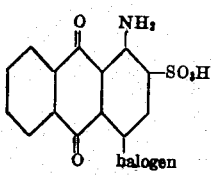

and acting on the diazo-compound thus formed with copper.

2. Process which comprises diazotizing 1-amino-4-bromo-anthraquinone-2-sulfonic acid of the formula:

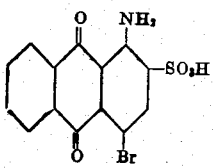

and acting on the diazo-compound thus formed with copper.

3. Process which comprises diazotizing 1-amino-4-bromo-anthraquinone-2-sulfonic acid of the formula:

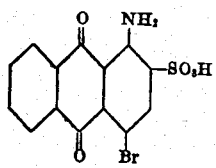

and acting on the diazo-compound thus formed with an amount of a copper-compound sufficient for forming the copper salt of the produced 1-hydroxy-4-bromo-anthraquinone-2-sulfonic acid.

4. As new compounds the 1-hydroxy-4-halogen-anthraquinone-2-sulfonic acids, of the formula:

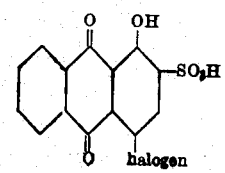

which compounds are in the form of their sodium salts soluble in water with yellow tints turning to red on the addition of alkali.

5. As a new compound the 1-hydroxy-4-bromo-anthraquinone-2-sulfonic acid of the formula:

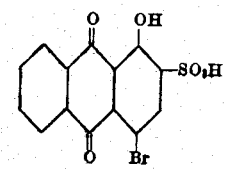

which compound is in the form of its sodium salt soluble in water with a yellow tint turning to dark red on the addition of alkali.

In testimony whereof, I affix my signature.

ERNST HONOLD.